United States Patent [19]

Appel et al.

[11] 4,340,563

[45] Jul. 20, 1982

[54] METHOD FOR FORMING NONWOVEN WEBS

[75] Inventors: David W. Appel, Wittenberg; Michael T. Morman, Appleton, both of Wis.

[73] Assignee: Kimberly-Clark Corporation, Neenah, Wis.

[21] Appl. No.: 146,450

[22] Filed: May 5, 1980

[51] Int. Cl.³ .............................................. B29J 5/00
[52] U.S. Cl. ..................................... 264/518; 19/299; 264/176 F; 264/210.8; 264/237; 425/66; 425/72 S; 425/83.1
[58] Field of Search ................. 264/176 F, 518, 210.8, 264/237; 19/299; 425/72 S, 66, 80.1-83.1

[56] References Cited

U.S. PATENT DOCUMENTS

| | | | |
|---|---|---|---|
| 3,304,163 | 2/1967 | Holschlag | 264/176 F |
| 3,692,618 | 9/1972 | Dovschnev et al. | 264/176 F |
| 3,698,610 | 10/1972 | Feltgen et al. | 19/299 |
| 3,802,817 | 4/1974 | Matsuki et al. | 264/176 F |
| 3,999,910 | 12/1976 | Pendleburg et al. | 264/176 F |
| 4,064,605 | 12/1977 | Akigawa et al. | 425/66 |

FOREIGN PATENT DOCUMENTS

| | | | |
|---|---|---|---|
| 1507592 | 12/1967 | France | 19/156.3 |
| 46-14568 | 4/1971 | Japan | 264/176 F |
| 1285381 | 8/1972 | United Kingdom | 264/176 F |

*Primary Examiner*—Jay H. Woo
*Attorney, Agent, or Firm*—William D. Herrick; Wendell K. Fredericks; Howard Olevsky

[57] ABSTRACT

An improved method and apparatus for forming nonwoven webs by spinning filaments into a quench chamber where they are contacted with a quenching fluid, then utilizing the quench fluid to draw the filaments through a two-dimensional nozzle spanning the full machine width, and collecting the filaments as a web on a porous surface. In contrast with the prior art, low motive fluid pressures can be used, and a non-eductive drawing means utilized to minimize air turbulence and the resulting filament entanglement in the drawing means while maintaining substantially constant cross machine filament distribution. The apparatus and process reduce problems relating to filament breakage and spreading and result in increased productivity and improved web formation. Other advantages include the ability to continuously spin highly pigmented polymer filaments and reduced hazards associated with high noise levels.

8 Claims, 4 Drawing Figures

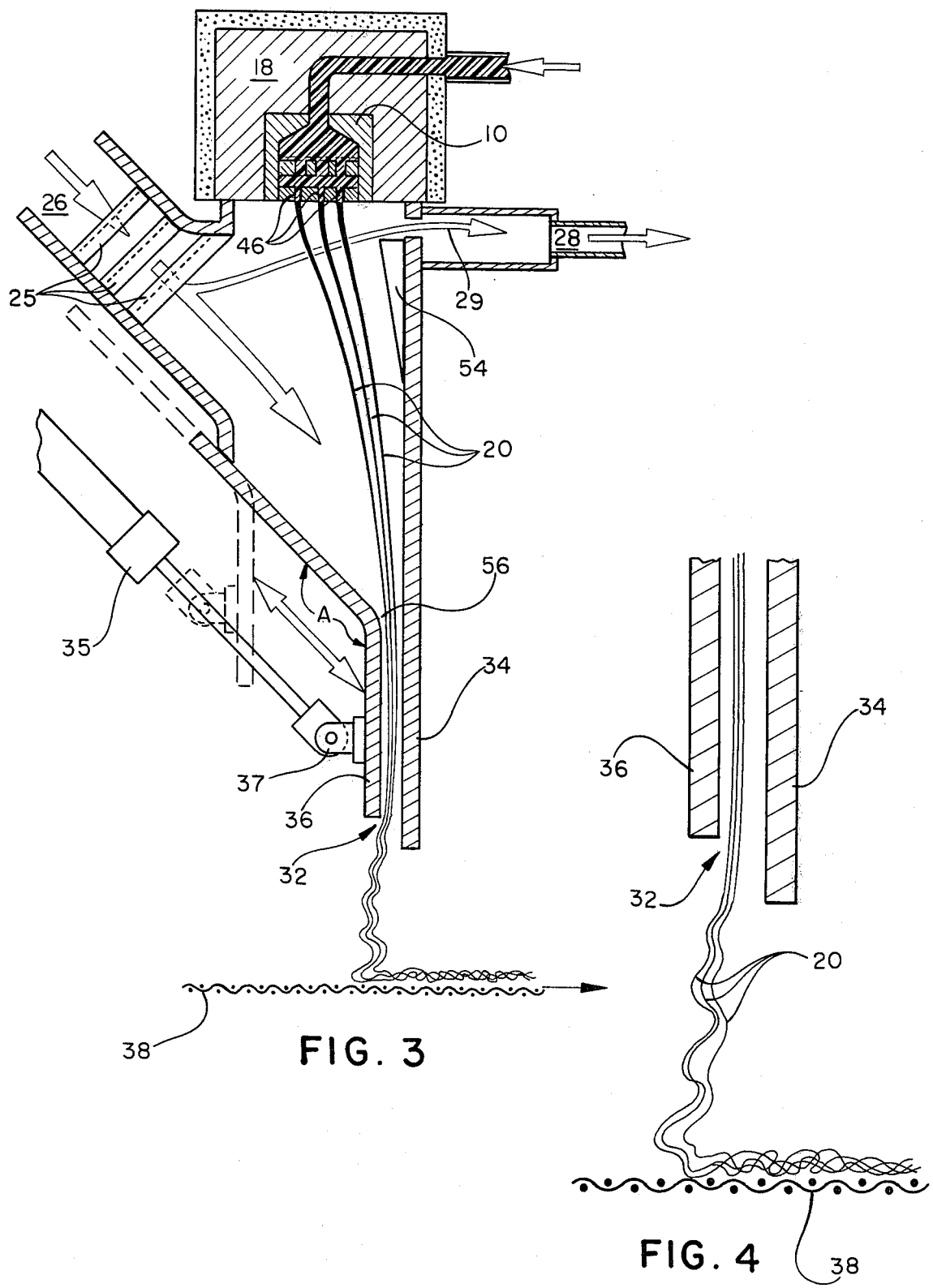

METHOD FOR FORMING NONWOVEN WEBS

BACKGROUND OF THE INVENTION

1. Field of the Invention

The manufacture of nonwoven webs has matured into a substantial industry. A wide variety of processes for making such webs has been developed ranging from papermaking to spinning of polymers with air guns or mechanical drawing. A wide variety of uses also has been developed for such webs including, (1) single use items such as surgical drapes, (2) multiple use products such as wiping cloths, (3) durable fabrics for the manufacture of carpeting and the like and (4) components in disposable products such as diapers and sanitary napkins. The present invention is directed to methods and apparatus for forming nonwoven webs, particularly those having a basis weight generally in the range of from 0.1 to 10 oz/yd$^2$, by spinning thermoplastic polymers. Such webs find uses in the manufacture of disposable products such as diaper liners and sanitary napkin wraps. In the heavier basis weights, the webs may even be used for more demanding applications such as carpet backing, tent fabric, and the like.

In general, the present invention is directed to nonwoven webs formed by spinning filaments of thermoplastic polymers, drawing them aerodynamically to a desired denier and collecting the filaments on a porous surface in an overlapping fashion to form a web which, when bonded, provides a material having sufficient strength for many applications and which can be further treated for additional applications. More particularly, the present invention is directed to such a method and apparatus which makes nonwoven webs by forming a row or rows of filaments extending for the full machine width and drawing the filaments in a full machine wide nozzle.

2. Description of the Prior Art

It is well-known to produce nonwoven webs from thermoplastic materials by extruding the thermoplastic material through a spinnerette and drawing the extruded material into filaments by eduction to form a random web on a collecting surface.

Eductive drawing occurs where discrete jets are formed which entrain a surrounding fluid in turbulent flow. In general, eductive devices require separate sources of fluid, usually air, and produce drawing by kinetic energy. For example, U.S. Pat. No. 3,692,618 to Dorschner et al describes such a process and apparatus for carrying it out employing a series of eductive guns through which bundles of filaments are drawn by very high speed air requiring a high pressure source. An attempt is then made to spread or oscillate the bundles to generate overlapping loops in a web which then can be bonded and employed in applications for nonwovens. Drawbacks to this process and apparatus include:

(1) the necessity for a high pressure air supply;

(2) the educting of low pressure air causing highly turbulent flow, and, therefore, filament intertwining;

(3) the difficulty of getting all the eductors to produce filaments having the same characteristics;

(4) plugging of the eductors by broken filaments; and (5) non-uniform basis weight profiles resulting from poor bundle spreading or variations in degree of filament entanglement.

British Pat. No. 1,285,381 to Fukada et al describes a similar eductor process and apparatus which, while employing a full machine width drawing chamber, uses exit nozzles that are subject to the same problems of plugging, rethreading, and turbulent mixing encountered with the guns of the previously described patent. This patent also discloses a noneductive arrangement having a segmented configuration. U.S. Pat. No. 3,802,817 to Matsuki et al also describes a full width eductor device and method which, while avoiding the exit nozzle plate of Fukada et al, still requires high pressures and is limited to lower speeds for practical operation. U.S. Pat. No. 4,064,605 to Akiyama et al similarly describes apparatus employing high speed air jet drafting.

SUMMARY

The present invention is directed to a noneductive drawing method and system for spinning thermoplastic polymer filaments. The systems of the prior art discussed above involve eductor-type devices for drawing filaments. These devices inherently create high levels of turbulence and vorticity which tend to entangle the filaments limiting the uniformity of the products made. Furthermore, such prior art systems involve small eductor throat openings which suffer drawbacks such as frequent plugging. These systems also require two sources of air and the two sets of associated equipment; one low pressure cooled air source is used to quench the molten filaments to the solidified state, and the other a high pressure air source needed to produce high velocity air to draw the filaments—the high velocity air generating high noise levels as it draws the filaments.

In contrast, the system and method of the present invention involve an initial quench chamber and the use of a continuous narrow nozzle across the entire machine width which produces a linear plane of filaments in the nozzle section having substantially constant filament distribution across the machine width, and provides good control of cross-machine uniformity. No air is educted into this system as the quench air undergoes uniform acceleration into the nozzle where the drawing force is developed so turbulence and its effects are minimal. The same air is used for two purposes: first to quench the filaments and then to draw them as the air exits through the drawing nozzle at high velocity. This double use of the air reduces utility cost and the required capital investment in air handling equipment and ducting. By selecting a suitable length of nozzle, the necessary drawing tension can be obtained with an air speed in the nozzle of only about 1.5 to four times the filament velocity. In such cases, for example, an air speed of 275 feet per second may be used to produce a filament speed of 157 feet per second requiring a plenum pressure of only 0.65 psig. for a nozzle opening of ⅜ inch (Example #6, in the accompanying Table). In that case, for example, the air requirement would be only about 43 scfm per inch of machine width for filament drawing. Filament cooling is controlled by regulating the temperature of the quench air and controlling the rate of flow of air past the filaments to an exhaust port near the top of the quench chamber. The amount of quench air exiting the duct is important to the operation of the process, so this flow rate is preferably closely monitored and controlled. If there is too high an exhaust flow, the velocity of the air through the filament bundle will cause the filaments to waver and stick to each other causing filament breakage. The filaments will also be cooled too rapidly and large denier, brittle filaments will be produced. With too little exhaust, the filaments will not be totally quenched when they enter the drawing nozzle, increasing the incidence of sticking to the nozzle surfaces.

To achieve the benefits of the present invention, it is essential that the apparatus be constructed and the method carried out within certain ranges of parameters. For example, the quench air should be maintained at a temperature in the range of from about 40° F. to 130° F. The air flow rate should be maintained within the range of from 20 to about 80 scfm per inch of machine width and the nozzle opening from about ⅛ to 1 inch. As indicated above, the exhaust flow rate is important in achieving the desired filament properties, and generally, will be within the range of from nearly 0 to about 14 scfm per inch of machine width.

The length of the quench chamber and the length of the drawing nozzle will depend, of course, upon the material being spun and the particular web properties desired. Accordingly, these parameters may vary widely, but, in general, will be within the range of from about 50 inches to 80 inches, preferably at least two feet, for the length of the quench zone and about 10 inches to 40 inches for the length of the drawing nozzle. Similarly, the spinnerette capillaries may be in many configurations but will, generally, be employed in the range of from about 3 to about 40 per square inch in a uniform capillary array. As will be apparent from the foregoing, the method and apparatus of the present invention are extremely flexible and can be varied to accomodate a wide variety of materials and operating conditions. Such is a particular advantage and feature of the present invention.

BRIEF DESCRIPTION OF THE DRAWINGS

FIGS. 3 and 4 are cross-sectional views illustrating filament forming and laydown in further detail.

DESCRIPTION OF THE PREFERRED EMBODIMENTS

While the invention will be described in connection with preferred embodiment, it will be understood that it is not intended to limit the invention to those embodiments. On the contrary, it is intended to cover all alternatives, modifications and equivalents as may be included within the spirit and scope of the invention as defined by the appended claims.

Figure 1:
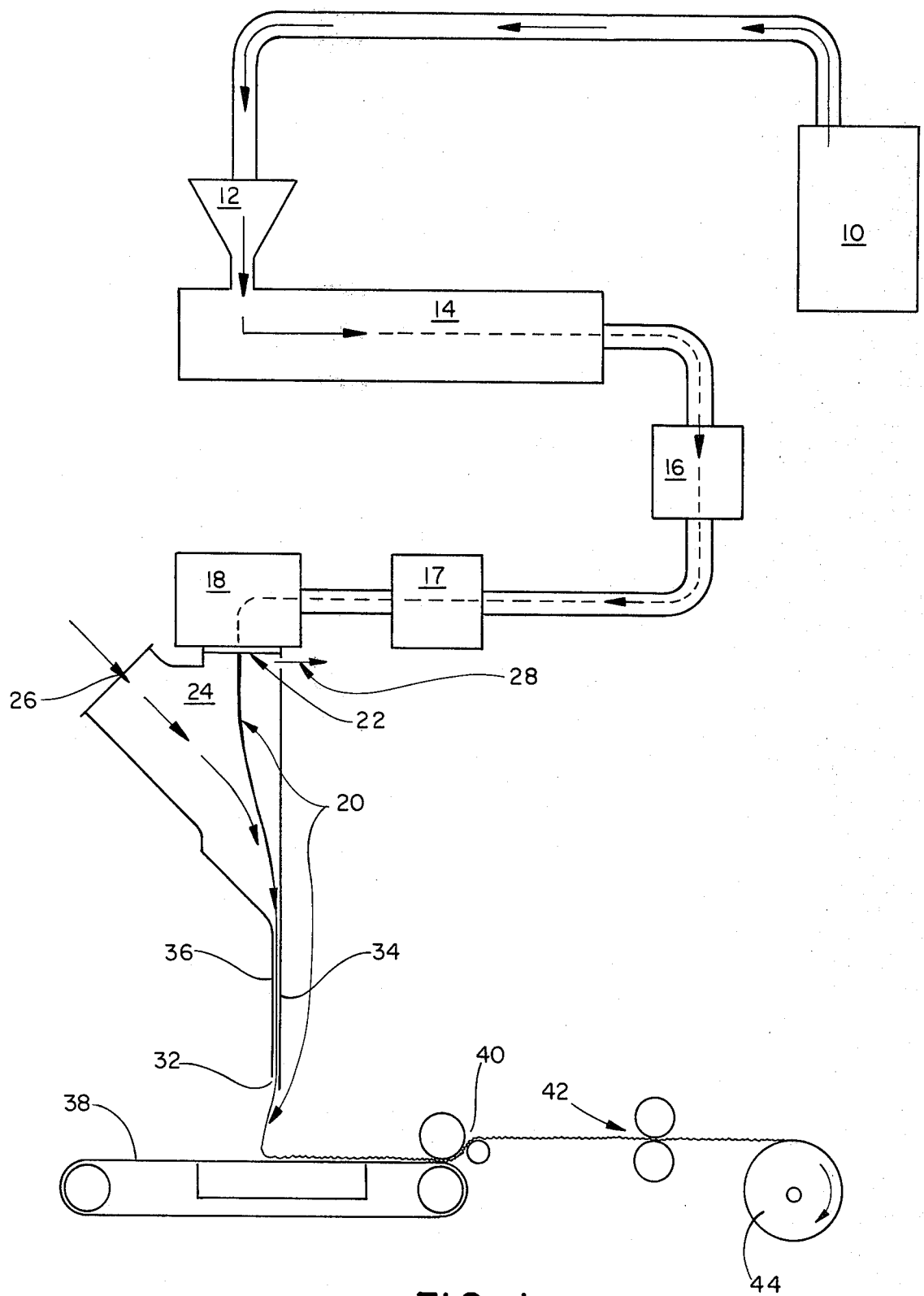
FIG. 1 is a generalized flow diagram illustrating the process of the present invention.

Turning first to FIG. 1, the method of the invention will be further described. As shown, the first step is to provide a thermoplastic polymer in fluid condition for spinning. The flexibility of the system and method of the present invention allows a wide variety of polymers to be processed. For example, any of the following may be employed: polyamides, polyesters, polyolefins, polyvinyl acetate, polyvinyl chloride, polyvinyl alcohol, cellulose acetate, viscose, and the like. It is, of course, contemplated to also utilize other spinable materials which may not be ordinarily considered polymers such as, for example, molten glass. It is important that the material be capable of being made sufficiently fluid for spinning and otherwise have the properties necessary to undergo drawing in the filament drawing zone. Other examples will become apparent to those skilled in the polymer art.

The polymer is fed from supply 10 to hopper 12, then through extruder 14, filter 16, and metering pump 17 to spin box 18. Filaments 20 are spun through spinnerette 22 with openings arranged in one or more rows forming a curtain of filaments 20 directed into the quench chamber 24. In the quench chamber 24 filaments 20 are contacted with air or other cooling fluid through air inlet 26 and maintained cooler than said filaments preferably near ambient temperatures, for example, in the range of from about 40° to 130° F. The quenching fluid is supplied under low pressure of less than 12 psi, preferably less than 2 psi, and a portion is preferably directed through the filament curtain 20 and removed as exhaust through port 28. As described above, the proportion of the air supplied that is discharged as exhaust will depend on the polymer being used and the rapidity of quenching needed to give desired filament characteristics such as denier, tenacity and the like. In general, the greater the amount of air exhausted, the larger the resulting filament denier and, conversely, the lower the exhaust air ratio, the lower the denier.

As quenching is completed, the filament curtain is directed through a smoothly narrowing lower end 30 of the quenching chamber into nozzle 32 where the air attains a velocity of about 150 to 800 feet per second. The drawing nozzle, is full machine width and preferably formed by a stationary wall 34 and a movable wall 36 spanning the width of the machine. As will be described more particularly with respect to FIG. 3, the movable wall can be retracted under the quench air screens or moved toward the stationary wall. During start-up, the wall is fully retracted so the filaments fall by gravity through the wide open nozzle. The low velocity of the incoming quench air is maintained through the wide open nozzle so little aerodynamic drawing actually occurs. When polymer flow is fully established, the movable wall is moved forward to decrease the nozzle opening, increase the air velocity, and draw the filaments. If a major process upset occurs and the drawing nozzle becomes partially plugged with polymer during oeration, the movable wall is momentarily drawn back until the plug falls through the enlarged nozzle. The wall is then moved forward to its normal operating position.

The position of this movable wall determines the drawing nozzle opening and thus the velocity of the air going through the nozzle for a given quench air flow rate and exhaust setting. The filament drawing force increases as the air velocity increases so the filament denier can be easily changed by simply increasing or decreasing the size of the nozzle opening. In general, the filament denier can be increased by:

(1) enlarging the nozzle opening,
(2) reducing the air flow rate through the nozzle,
(3) increasing the exhaust air flow rate,
(4) lowering the quench air temperature,
(5) decreasing the polymer temperature,
(6) increasing the polymer molecular weight, e.g., decrease the melt flow rate, or
(7) increasing the polymer throughput per capillary.

Steps (1) and (2) reduce the air drawing force; (3) and (4) increase the polymer quench rate; (5) and (6) increase the polymer extensional viscosity and (7) increases the mass of polymer to be accelerated.

For polypropylene, the melt temperature will generally be in the range of from about 208° C. to about 320° C. with a melt index (190° C., 2160 g) of the polymer at the spinnerette in the range of about 17 to about 110.

With such materials, the polymer throughput may be in the range of from about 0.25 to 4 pounds per hour per square inch of spinnerette capillary area. Under these conditions, satisfactory operations have been obtained using a nozzle gap in the range of from about 1/16 inch to about 1.0 inch.

Thus, the filament deniers can be changed relatively easily and rapidly in several different ways which do not affect the distribution of filaments out of the nozzle. In all cases, the nozzle spans the entire width of the machine. Therefore, a distribution of filaments corresponding substantially identically to the distribution of orifices in the spin plate across the machine width is maintained all the way to the outlet of the nozzle.

After exiting from the nozzle, the filaments may be collected on a moving foraminous surface 38 such as an endless screen or belt to form a nonwoven web 40. By selecting the nozzle opening and forming distance, the dimensional characteristic of looping of individual filaments can be controlled to provide overlap of individual filaments. This results in a certain amount of intertwining and sufficient integrity in the resulting web to facilitate further processing such as web compacting at roll nip 40, bonding at roll nip 42, and winding at 44 of the cohesive fabric.

Figure 2:
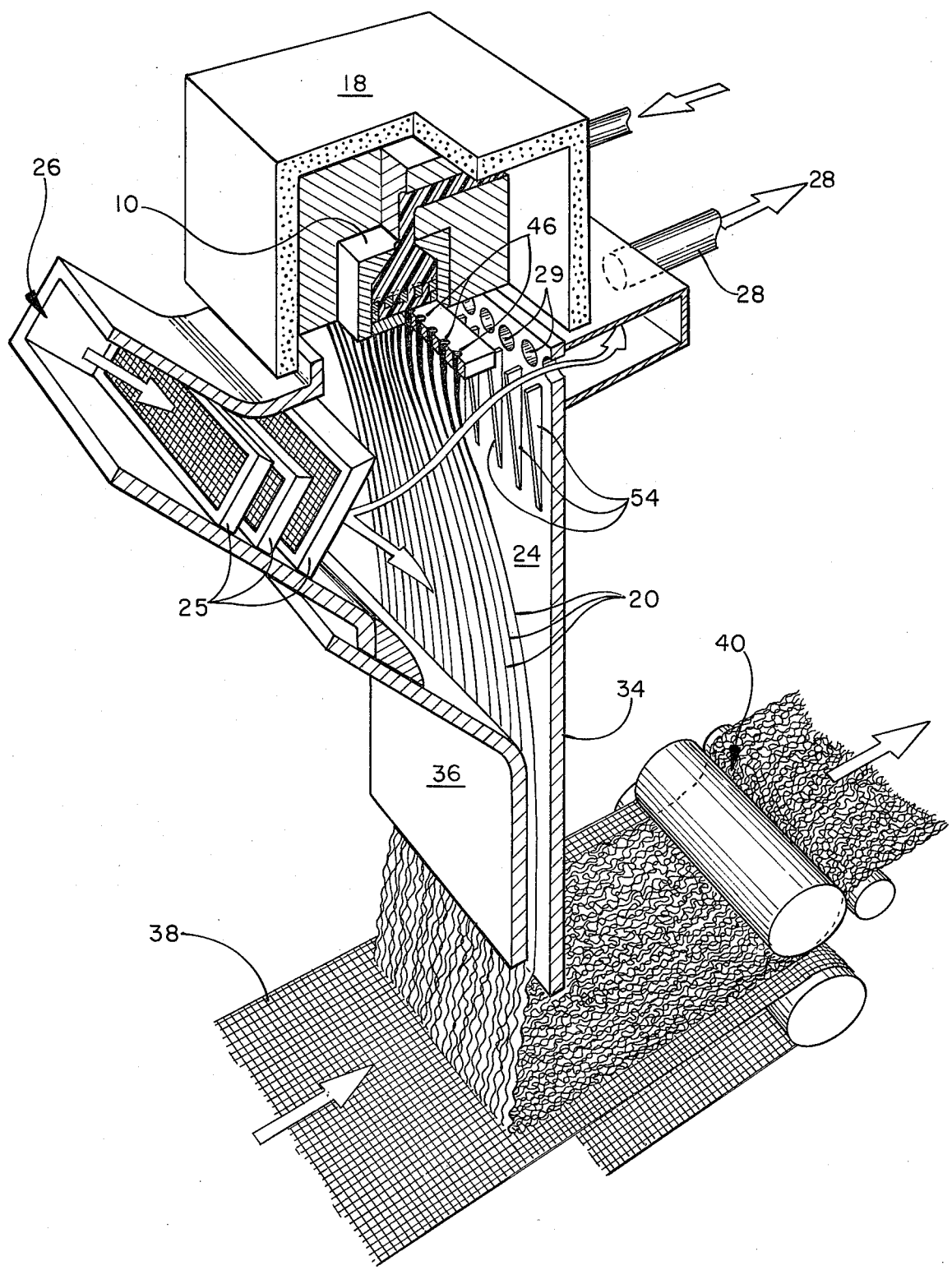
FIG. 2 is a schematic cross-sectional perspective view of the apparatus of the present invention.

Turning to FIGS. 2 and 3, the quench chamber 24 and nozzle area 34 will now be described in greater detail. The spinnerette 10 may be of conventional design and arranged to provide extrusion of filaments 20 having a spacing of about 0.15 to 0.56 inch and, preferably 0.25 to 0.30 inch in one or more rows of evenly spaced orifices 46 across the full width of the machine into the quench chamber. In a preferred embodiment, the centerline of the quench chamber is offset from the spinnerette centerline to accomodate "bowing" of the filaments as quench fluid passes through. The size of the quench chamber will normally be only large enough to avoid contact between the filaments and the sides and to obtain sufficient filament cooling. Immediately after extrusion through the orifices, acceleration of the strand movement occurs due to tension in each filament generated by the aerodynamic drawing means. They simultaneously begin to cool from contact with the quench fluid which is supplied through one or more screens 25 in a direction preferably at an angle having the major velocity component in the direction toward the nozzle entrance. The quench fluid may be any of a wide variety of gases as will be apparent to those skilled in the art, but air is preferred for economy. The quench fluid is introduced at a temperature in the range of from about 40° to 130° F. to provide for controlled cooling of the filaments. As shown and discussed above, the filament curtain will be displaced somewhat from a vertical path by the transverse force of the quench flow. The quench zone may be designed to provide for such movement by positioning the spin plate several inches off the centerline of the drawing nozzle toward the quench air supply.

It is desirable to provide an offset that allows the filaments to pass into the nozzle with little or no contact with the curved entry surface. The exhaust air fraction exiting at 28 from ports 29 is very important as it affects how fast quenching of the filaments takes place. A higher flow rate of exhaust fluid results in more being pulled through the filaments which cools the filaments faster and increases the filament denier. It will be recognized that if the filaments are still molten when entering the drawing nozzle, the system will not operate reliably as sticking to the nozzle will occur. The length of the quench chamber should be sufficient for cooling the filaments to a tack-free temperature ahead of the entry to the nozzle. A length of 2 feet or more is preferred because this allows adequate time for quenching a large number of filaments at high production rates without requiring low temperature air or high exhaust flow. It is also preferred that entrance to the nozzle formed by side 36 be smooth at corner 56 and at an angle A of at least about 135° to reduce filament breakage. Some arrangement for adjusting the relative locations of sides 34 and 36 is preferably provided such as piston 35 fixed to side 36 at 37. In a particularly preferred embodiment, some means such as fins 54 are provided to prevent a turbulent eddy zone from forming. The configuration, spacing, and number of such fins will depend on factors such as chamber width and bow of the filaments, but, in general, will be thin, for example, less than $\frac{1}{8}$ inch and spaced no more than $\frac{3}{4}$ inch apart filling the entire corner formed by the bowed filaments.

Turning to FIG. 4, the drawing nozzle will now be described in greater detail. The filaments are directed from the quench chamber to the arrow nozzle where the drawing force is developed. The fluid pressure in the quench zone is above the fluid pressure at the exit from the nozzle to provide the desired fluid velocity and resulting filament drawing. The fluid velocity through the nozzle is selected in combination with the length of the nozzle to achieve the desired degree of drawing and resulting filament properties. The nozzle is full machine width and sufficiently narrow to produce the needed fluid velocity for a given air inflow rate. The particular nozzle opening between surfaces 32 and 34 selected will vary depending upon the desired filament properties and other process set points, but will ordinarily be in the range of from about $\frac{1}{8}$ inch to 1 inch and preferably between $\frac{1}{4}$ inch to $\frac{3}{4}$ inch. In designing the noneductive drawing system of the invention, selection of the length of drawing nozzle and the preferred nozzle opening can be made to complement the fan or compressor used to provide the air. A short nozzle and large nozzle opening both mandate use of a relatively high volume flow of air, in the first instance because high drawing velocity is required, and in the second instance, because the cross-sectional area is large but, the required air pressure is relatively low. On the other hand, a long nozzle provides more length of filament exposed to motive shear stress from the drawing air and, hence, develops the required force with lower air velocity and thus requires less volume flow of air, but a higher pressure due to high friction loss in the nozzle.

Likewise, a smaller nozzle opening reduces the necessary volume of air flow, but also increases the required supply pressure due to increased friction loss. In general, the air pressure required is less than about 12 psi and preferably less than about 2 psi which is a small fraction of that required for eductive systems. The interrelationship between these factors is well known in the science of fluid flow and to those skilled in the technology.

At the exit of the nozzle, the flow becomes a free jet subject to turbulent diffusion of momentum. Mean velocity decreases and within a distance of about 20 times the small dimension of the nozzle opening the drawing force reaches zero and tension in the filaments is released allowing them to be displaced by local turbulent eddies. This results in the formation of irregular loops in the formed web and thereby provides a degree of physical overlapping necessary for producing an integrated web. This looping has a characteristic size or scale that is determined by the nozzle opening and the distance to the forming surface opening. In a preferred embodiment of the present invention, sides 36 and 34 forming nozzle opening 32 are of a different length, one being as much as about 3 inches and, preferably, ¾ to 1¼ inches longer than the other. This arrangement increases regular and predictable filament wavy motion in the cross machine direction which increases web entanglement and masks momentary disruptions of filaments exiting the drawing nozzle. In all cases, however, the looping is completely free of large-scale components which are prominent in systems requiring lateral spreading of filaments between the device for producing the drawing force and the forming wire, particularly when operated at high production rates, for example, 5 pounds per inch of machine width per hour or more. Filaments coming from a small nozzle opening such as ⅛ inch have a loop primarily in the range of from about ⅛ inch to ¼ inch in size and the largest loops or migrations of filaments of only about 1 inch when the web is collected at a distance of 15 inches from the nozzle. On the other hand, a nozzle of ½ inch opening generates larger loops primarily ¼ to ½ inch in size. When forming takes place close to the nozzle outlet such as at a distance of 6 inches, the largest migrations of filaments are only about ½ inch in size. There are two ways in which the small looping of filaments in this system is important. First, the structure of the resulting web is inherently different from one in which large-scale loops dominate. The difference is particularly apparent when there are strong aggregations of filaments associated with large-scale loops so that variation in spatial distribution of basis weight is not only large in scale, but also great in intensity. With only small loops and migrations of filaments there are fewer aggregations to form heavy concentrations in the web, so that intensity of variation as well as size of variations in basis weight are small. The second advantage of small loops is that the free-jet portion of the forming operation has virtually no effect on the overall distribution of basis weight across the machine, i.e., control resides in the distribution of holes in the spin plate.

It will be apparent to those skilled in the science of fluid flow that air supplied to the quench chamber must be not only cooler than the filaments, but substantially uniform in distribution, free of secondary circulations and low in turbulence. Ideally, a streamlined flow is desired from the quench chamber into the nozzle in order to maintain a uniform, constant distribution of filaments. For this purpose, one or more screens 25 are preferably provided at the quench inlet 26. The flow undergoes great acceleration through the lower part of the quench chamber and, hence, is not particularly susceptible to instabilities, but the approach flow must be essentially free of any large scale eddies or vorticies. Normal development of turbulence within the nozzle does not have a major effect on the filaments because of its small scale.

In accordance with the foregoing, it will be apparent that the method and apparatus of the present invention are subject to widely varying operating conditions and thereby provide great flexibility. Because of the full width and relatively large opening of the nozzle, the system and method have a dramatically reduced tendency for plugging and provide automatic restringing if a filament breaks. Since the process is relatively insensitive to filament breakage, it is possible to spin filaments that are highly loaded with pigments and the like producing colored and additive-modified webs. Finally, the system and method are by design not subject to large-scale air turbulence nor to the erratic conditions usually encountered with filament spreading with the result that more uniform webs may be obtained of attractive appearance and consistent physical properties.

The specific examples below are illustrative of the operation and results obtained in accordance with the present invention. They were carried out on apparatus generally as illustrated in the accompanying FIGS. 1–4 having paramenters as indicated in the Table, a quench zone length of 56 inches, a nozzle length of 40 inches, and a capillary throughput as indicated.

TABLE

| Example | Polypropylene Incoming Melt Flow | Polypropylene Processed Melt Flow | Melt Temp. °C. | Jet Gap, Inches | Quench Air SCFM/In | Exhaust Air SCFM/In | Quench Air Temp °F. | Throughput Grams/Hole/Min. | Duct Pressure In. Hg. | Denier | Tenacity | Elongation |
|---|---|---|---|---|---|---|---|---|---|---|---|---|
| 1 | 14 | 17 | 234 | .375 | 45 | 1.7 | 94 | .77 | 1.8 | 3.22 | 2.67 | 221 |
| 2 | 14 | 16.3 | 245 | .375 | 36 | 0 | 102 | .69 | 1.1 | 2.22 | 3.19 | 222 |
| 3 | 14 | 113 | 293 | .0625 | 12.5 | 1.6 | 60 | .53 | 13.0 | 2.42 | 2.83 | 133 |
| 4 (1) | 14 | 18.1 | 253 | .375 | 44 | 4.4 | 106 | .82 | 1.8 | 2.80 | 2.32 | 359 |
| 5 (2) | 14 | 22.3 | 242 | .375 | 46 | 3.7 | 70 | .75 | 1.4 | 2.57 | 2.99 | 228 |
| 6 | 14 | 18.3 | 305 | .375 | 46 | 3.5 | 95 | .70 | 1.3 | 2.17 | 3.73 | 227 |
| 7 | 14 | 17.5 | 216 | .250 | 42 | 6.4 | 69 | .77 | 2.9 | 3.16 | 3.51 | 244 |
| 8 | 14 | 17.2 | 276 | .50 | 52 | 0 | 95 | .56 | 0.8 | 2.38 | 3.36 | 211 |
| 9 | 14 | 82 | 291 | .0625 | 19 | 1.6 | 60 | .90 | 21.7 | 2.75 | 4.57 | 168 |
| 10 | 14 | 82 | 291 | .0625 | 16 | 1.6 | 60 | .71 | 14.1 | 2.54 | 4.29 | 177 |
| 11 | 14 | 17 | 260 | .375 | 49 | 0 | 71 | .77 | 1.5 | 2.89 | 2.76 | 227 |
| 12 | 14 | 19 | 274 | .250 | 35 | 7.3 | 99 | .48 | 5.6 | 2.94 | 2.92 | 252 |
| 13 | 14 | 18 | 314 | .375 | 46 | 3.7 | 115 | .70 | 1.4 | 2.70 | 2.74 | 250 |
| 14 | 14 | 24.7 | 256 | .1875 | 37 | 1.6 | 47 | .93 | 9.9 | 2.49 | 2.63 | 83 |
| 15 | 14 | 43.5 | 218 | .125 | 30 | 0 | 62 | .52 | 24 | 1.41 | 2.22 | 117 |
| 16 | 14 | 20 | 268 | .50 | 39 | 0 | 86 | .56 | 0.5 | 2.65 | 2.08 | 230 |
| 17 | 14 | 17.9 | 276 | .375 | 42 | 4.8 | 100 | .60 | 2.1 | 2.39 | 2.84 | 180 |
| 18 | 14 | 19.6 | 212 | .50 | 48 | 2.7 | 60 | 2.68 | 0.9 | 19.99 | 1.86 | 295 |
| 19 | 42 | 70.4 | 230 | .125 | 35 | 0 | 93 | .28 | 15.7 | .83 | 2.38 | 215 |
| 20 | 14 | 17.8 | 237 | .250 | 38 | 7.5 | 70 | .66 | 4.1 | 3.10 | 1.45 | 288 |
| 21 | 14 | 82.5 | 291 | .125 | 23 | 1.6 | 60 | .71 | 8.7 | 2.39 | 3.78 | 104 |
| 22 | 42 | 54.4 | 230 | .375 | 47 | 3.4 | 60 | 2.94 | 1.2 | 10.8 | 1.69 | 324 |
| 23 | 14 | 21.4 | 272 | .250 | 38 | 6.4 | 80 | .75 | 4.2 | 3.65 | 1.91 | 178 |
| 24 | 14 | 18.1 | 210 | .375 | 47 | 3.2 | 70 | .70 | 1.2 | 2.10 | 3.14 | 206 |
| 25 | 14 | 19.1 | 234 | .375 | 45 | 3.9 | 99 | .66 | 1.6 | 3.08 | 2.59 | 222 |

TABLE-continued

| Example | Polypropylene Incoming Melt Flow | Polypropylene Processed Melt Flow | Melt Temp. °C. | Jet Gap, Inches | Quench Air SCFM/In | Exhaust Air SCFM/In | Quench Air Temp °F. | Throughput Grams/Hole/Min. | Duct Pressure In. Hg. | Denier | Tenacity | Elongation |
|---|---|---|---|---|---|---|---|---|---|---|---|---|
| 26 | 42 | 62 | 230 | .375 | 35 | 0 | 85 | .57 | 15.5 | 1.77 | 2.99 | 272 |
| 27 (3) | — | — | 273 | .375 | 51 | 2.6 | 65 | .95 | .8 | 4.80 | 3.75 | 147 |

NOTES:
(1) For this example, TiO hd 2 pigment was added to a level of 7.28% by weight.
(2) For this example Triton X-102 was added to a level of 0.8% by weight.
(3) For this example the polymer used was Nylon 6.

Sound level measurements were taken under conditions where the apparatus was operated with a nozzle gap of ¼ inch and full open, with background of 80 to 90 dB. At five foot elevations from the floor to operator ear level only one reading, taken 12 inches below the nozzle opening, exceeded 100 dB at 100.5. The rest were below 90 dB.

In summary, the foregoing specific examples illustrate the present invention and its operation. Preferred embodiments include the formation of low basis weight webs from fine polypropylene filaments of under 5 denier and production rates over 5 pounds per inch per hour; point bonding these webs to produce a nonwoven material useful for many applications including (1) liners for sanitary products, (2) limited use garments, (3) surgical drapes and even (4) durable goods.

Thus it is apparent that there has been provided, in accordance with the invention, an improved method and apparatus for forming nonwoven webs that fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. Method of forming a nonwoven web comprising the steps of,
    (a) forming one or more rows of closely spaced filaments by spinning molten polymer steams;
    (b) directing said spun filaments through a low pressure quench chamber;
    (c) contacting said filaments with a low pressure quenching fluid at a temperature cooler than said filaments within said quench chamber to produce substantially nontacky filaments while maintaining said filament cross machine distribution substantially constant;
    (d) drawing said filaments noneductively in a nozzle by substantially uniformly accelerating the quenching fluid to a uniform high velocity in a nozzle; and
    (e) collecting said filaments as a web of entangled filaments.
2. The method of claim 1 including exhausting a portion of said quench fluid at a point on the opposite side of said filaments from the point where contact between said quench fluid and said filaments first occurs.
3. The method of claim 1 including the step of forming small scale looping of said filaments by collecting at a distance from the nozzle exit equal to at least 20 times the smaller dimension of the nozzle opening.
4. The method of claim 1 wherein said quench fluid is air at a temperature in the range of from about 40° F. to 130° F. and at a flow rate of about 20 to 80 scfm per inch of machine width.
5. The method of claim 1 wherein the fluid material is a thermoplastic polymer.
6. The method of claim 1 including the step of adjusting the size of said nozzle opening by moving one nozzle side surface with respect to the other.
7. The method of claim 2 including controlling filament denier by adjusting the amount of exhaust quench fluid.
8. The method of claim 1 including the step of controlling the degree of filament entanglement in said web by making one surface of the nozzle exit longer than the opposite surface of the nozzle exit.

* * * * *